Oct. 27, 1964  E. R. McCALEB ETAL  3,154,162
ROTATABLE PRIME MOVER
Filed Oct. 17, 1960  5 Sheets-Sheet 1

INVENTORS.
Elman R. McCaleb
Donald E. Yadon
BY
McGrew and Edwards
ATTORNEYS

Oct. 27, 1964

E. R. McCALEB ETAL 3,154,162

ROTATABLE PRIME MOVER

Filed Oct. 17, 1960

INVENTORS.
Elman R. McCaleb
Donald E. Yadon

BY
McGrew and Edwards
ATTORNEYS

Oct. 27, 1964     E. R. McCALEB ETAL     3,154,162
ROTATABLE PRIME MOVER

Filed Oct. 17, 1960     5 Sheets-Sheet 4

INVENTORS.
Elman R. McCaleb
Donald E. Yadon
BY
ATTORNEYS

Oct. 27, 1964   E. R. McCALEB ETAL   3,154,162
ROTATABLE PRIME MOVER
Filed Oct. 17, 1960   5 Sheets-Sheet 5

INVENTORS.
Elman R. McCaleb
Donald E. Yadon
BY
ATTORNEYS 3,154,162
ROTATABLE PRIME MOVER
Elman R. McCaleb, Denver, and Donald E. Yadon, Littleton, Colo., assignors, by direct and mesne assignments, to The American Coleman Company
Filed Oct. 17, 1960, Ser. No. 62,916
8 Claims. (Cl. 180—6.66)

This invention is directed to a prime mover. More particularly, the present invention provides a prime mover adapted for 360° angular positioning about a stationary vertical axis, and which may be operated in any of said angular positions for pushing and pulling of loads and for scribing any arc or line in operation on its supporting surface.

Briefly, a prime mover according to our inventive concepts includes an outer circumferential member, with which a drawbar or connecting member is operatively associated, and which usually is referred to as a load handling member. The prime mover is propelled by a pair of spaced driving wheels mounted internally of the circumferential member and usually mounted along a common axis of rotation, as on axles which are coincident with a chord of the circumferential member. Each wheel is arranged for independent drive and they are arranged for selective reversing and/or conjoint rotation relative to each other to obtain desired movement.

With the prime mover of this invention, a single operator may easily manipulate loads through intricate and complicated courses while keeping within small work areas. Also, an operator may position the prime mover at any angular position relative to a fixed vertical axis without disturbing or inducing any movement in the load being worked. The prime mover is freely rotatable and movable to any angular position relative to its drawbar, connecting device or the like, through which motivating force is focused on the load being worked.

The present prime mover is capable of pushing, pulling and positioning loads through a drawbar, cable or the like, and the foregoing may be combined with actions for lifting and positioning at elevated places. The lifting may be by an associated platform means, crane and cable means, or other arrangements for holding a load and to which the focusing or motivating force may be directed.

A connecting device according to our invention may be independently positioned on the circumferential member and in combination with the other parts of the prime mover produces added mobility and operating advantages. This connecting device may be manually or power operated in its positioning movement.

It is, therefore, among the objects and advantages of our invention to provide a simple, durable and easily operated prime mover, operable by a single operator, and which may induce pushing, pulling and lifting movements to loads being worked. The device is capable of 360 degree rotation relative to a fixed vertical axis and is arranged for scribing any arc on a supporting surface when connected to or free from a load. The prime mover is capable of efficiently accomplishing intricate and complicated maneuvers in restricted working areas.

It is a further object of our invention to provide a prime mover which is capable of complicated maneuvering relative to a connecting device, through which motivating force is directed, without movement or disturbance of a load being worked.

Many other features and advantages will become readily apparent to those skilled in the art from a study of the detailed description and the appended exemplary drawings which are set forth hereinafter.

Before describing the drawings in detail, we wish it understood that they are merely exemplary of a possible mode of practicing our inventive concepts and we do not wish to be limited thereby but by the scope of the hereafter set forth claims.

Figure 1:
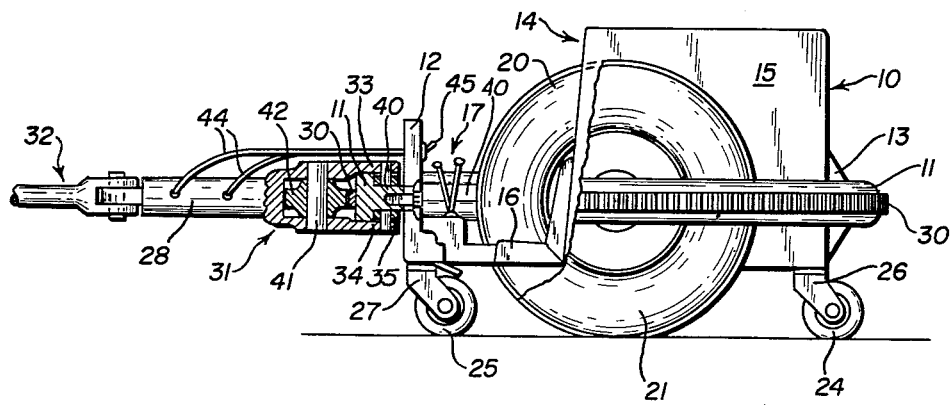
FIG. 1 is a side elevation, in partial section, of a self-propelled prime mover according to our invention.
Figure 2:
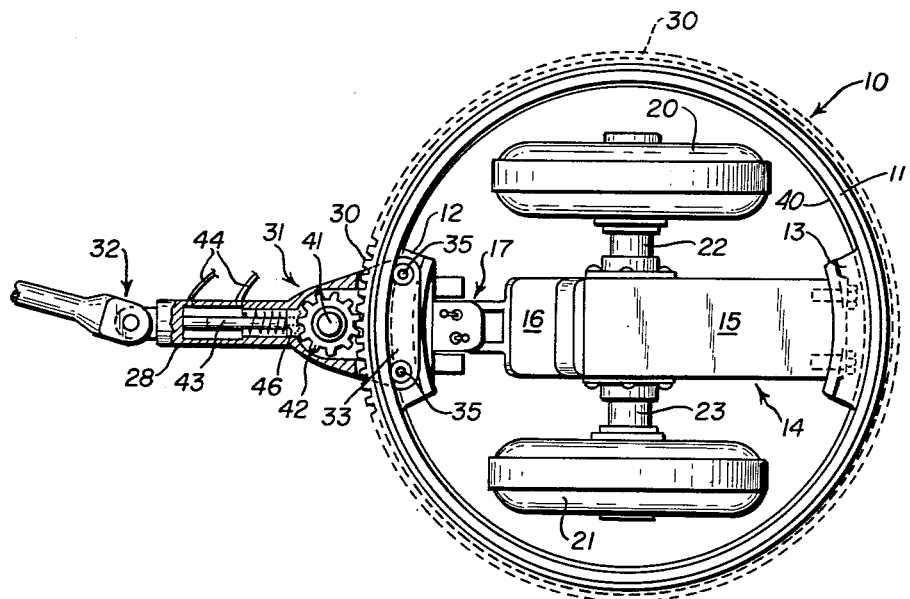
FIG. 2 is a top plan view in partial section of the prime mover of FIG. 1.

A self-propeller prime mover according to our invention is indicated by reference character 10 in FIG. 1. It is comprised essentially of a supporting structure for a horizontally disposed circumferential portion or ring 11. Referring to FIG. 2, the horizontal circumferential portion is of an annular configuration and carried on the supporting frame which includes supporting brackets 12 and 13 and an elongated body portion 14. The elongated body portion 14 supports an engine housing 15, an operator's seat 16 and driving controls 17. The seat 16 and the controls are arranged below the central bisector of the circumferential portion 11 which aids in presenting a very low silhouette during operation.

A pair of main driving wheels 20 and 21 are mounted on the frame 14 inwardly of the circumferential portion 11 on axle housings 22 and 23. These axle housings are substantially coincident with a major chord of the circumferential portion 11. A pair of fully castering wheels 24 and 25 mounted on suitable supports 26 and 27, respectively, serve as balancing means to assist in maintaining the prime mover in a substantially horizontal attitude relative to the surface over which it is moved. While it is preferred that two such balancing wheels be used, it is anticipated that three, four or more wheels suitably positioned on the apparatus may be used. When the main wheels are spaced from center of gravity, a single balancing castor may be used. Also, it is anticipated that in some environments skids, skis or the like may be used so long as the necessary balancing is accomplished.

A bull gear 30 is integrally mounted on the outer peripheral surface of the circumferential member 11. A drawbar or connecting device, generally indicated by reference character 31, is mounted on the ring 11 and spur gear 42 mounted therein is interconnected with bull gear 30. The connecting device 31 is freely movable around the ring 11 in such a manner as to allow the prime mover to freely move to any angular position relative to it. The connecting device may be interconnected to a towbar 32 for providing the motivating force of the prime mover to the load being worked. As shown, the towbar 32 is pivotally attached to the connecting means 31, however, where desirable it may be directly connected.

The connecting device 31 includes essentially a bifurcated frame member 28 having extending portions 33 and 34 which carry means such as rollers 35 for rolling interaction with an integral shoulder 40 on the internal peripheral surface of the ring 11. Mounted across the bifurcated portion of the connecting device, on pin 41, is a gear 42 which is arranged for selective engagement with the bull gear 30. A spring-biased solenoid-operated piston 43 is interconnected through the connecting wires 44 to a switch 45 on the operator's control panel on a vertical extension of the support 12. There is an annular opening at the end 46 of the piston 43. By actuation of the solenoid, the piston 43 is caused to move forward and back to engage and disengage a tooth or teeth of the gear 42 thereby selectively disengaging it and locking it in position (shown in dotted lines in FIG. 2).

Each of the driving wheels 20 and 21 is interconnected to the engine and is arranged for independent selective forward and reverse rotation. Thus by suitable manipulation of the controls, it is possible to move the prime mover to any position including rotation around the vertical central axis of the ring 11. The connecting member may also be moved to any position on the ring. Further, by imparting selective independent or conjoint rotation of the wheels, at the same or at different speeds in either the same or opposite directions, the prime mover may scribe any arc or line on its supporting surface. This provides completely free movement in two dimensions on the supporting surface.

Figure 3:
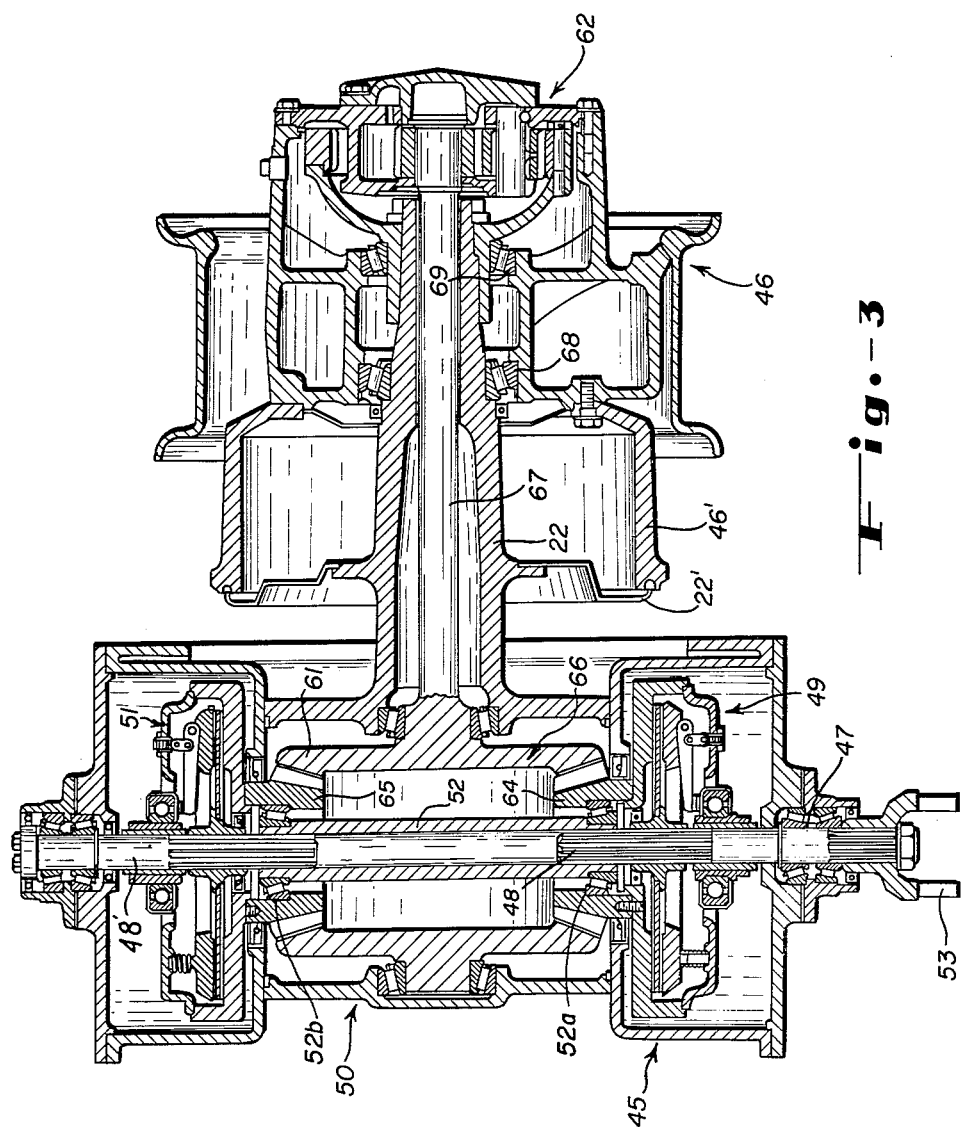
FIG. 3 is an enlarged detail in partial section of the differential and drive assembly for one of the driving wheels of the prime mover of FIG. 1.
Figure 4:
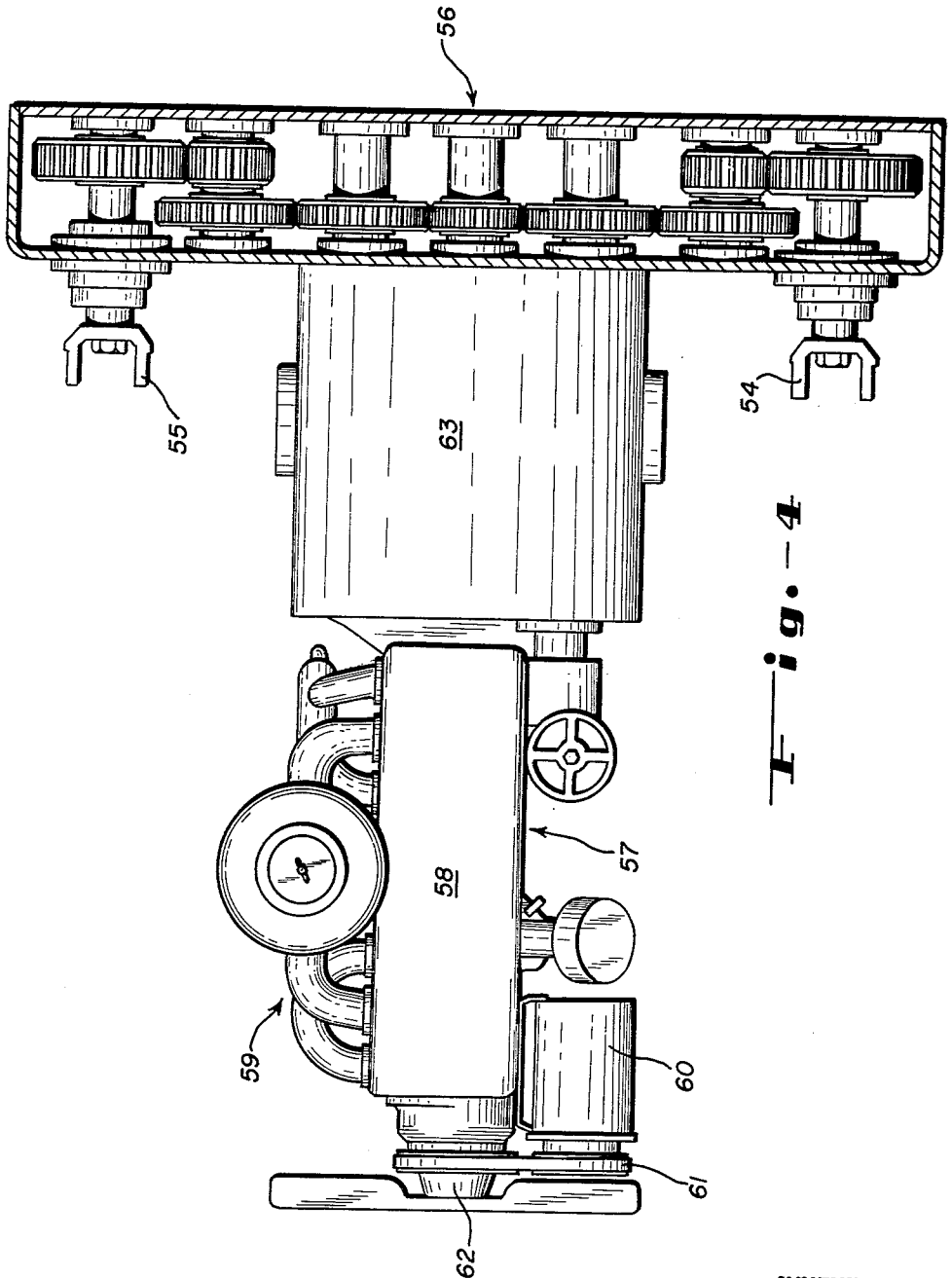
FIG. 4 is an enlarged partially schematic detail of the main power source and a portion of the drive system of the structure of FIG. 3.

Each wheel 20 and 21 is driven through a power transmission means from an engine 15. In the form illustrated in FIGS. 3 and 4, the power transmission includes a fluid coupling 63 (not shown in detail as such couplings are commonly used in drive systems) interconnected through a gear transmission train 56 to wheel drive 50. Clevis 53 of the wheel drive interconnects with the clevis 55 of transmission 56. Speed control is accomplished by the transmission as is common practice in such gear train drives, and reversing of the rotation of the wheels is accomplished by a clutch system.

The clutch system (FIG. 3) includes two one-way clutches 49 and 51 which are mounted on splined shafts 48 and 48', respectively, in opposition on a propeller shaft 52. The clevis 53 is connected to splined shaft 48 which is journalled in bearing set 47 in housing 45. These clutches are interconnected so that one is engaged when the other is disengaged or both may be disengaged. When clutch 49 is engaged, clutch 51 is disengaged, driving wheel rim 46 in one direction. When clutch 51 is engaged, clutch 49 is disengaged and the wheel rim 46 is rotated in the opposite direction. Both clutches are disengaged for non-driving position. The propeller shaft is journalled at its respective ends in bearing sets 52a and 52b.

The power transfer from the propeller shaft 52 is through a differential 66 by means of its interconnection with one of the clutches through bevelled gears 64 or 65. Drive shaft 67 is interconnected with and driven by bevelled gear 61 of differential 66. The wheel rim 46 is interconnected by a hub 62.

The wheel rim is journalled on axle housing 22 by bearing sets 68 and 69 for operation. A brake drum 46' is rotatively interconnected to the rim, and a dust shield 22' interconnected with housing 22 prevents entrance of dirt, etc. The brake bands and operational mechanism are not shown since such are commonly used with most vehicles.

The clutches are not described in detail since many different types are known and are commonly used in every type of vehicle. The type of clutch is not critical so long as one is operated in opposition to the other clutch. In other words when one clutch is engaged, the other must be disengaged. Obviously, when the vehicle is not moving both clutches must disengage when desired by the operator.

The outer end of the drive shaft 67 is suitably geared in the hub 62 to rotate the wheel around the axle housing 22 on the bearings 68 and 69. The wheel rims may be suitably mounted by known means so that pneumatic tires may be mounted on them.

The engine may be an internal combustion gasoline or diesel engine having an engine block 58, manifold system 59, and a generator 60 interconnected through fan belt 61 with the fan hub 62, as is well known. The engine is connected to the gear system in casing 56 through the fluid coupling 63.

Figure 5:
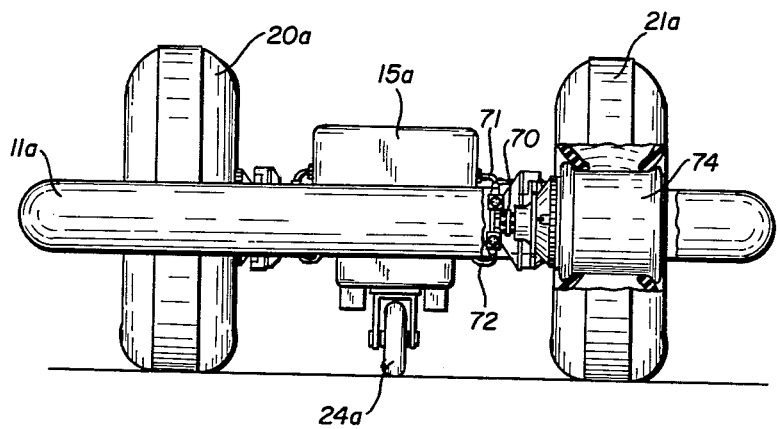
FIG. 5 is a front elevation in partial section of an alternative drive arrangement.
Figure 6:
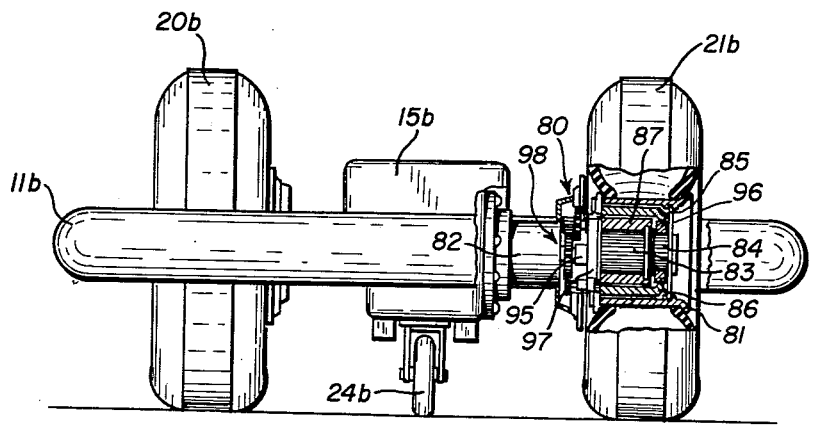
FIG. 6 is another alternative drive arrangement.

While in some locations the prime mover embodied in the foregoing description is preferable, other operations, such as indoor operations make it desirable that other types of power sources and related differentials and transmissions be used. FIGS. 5 and 6 show alternative arrangements within our inventive concepts using a hydraulic and an electric power system, respectively.

The prime mover of FIG. 5 includes a circumferential portion or ring 11a and driving wheels 20a and 21a. An engine casing 15a is supported between opposite inner peripheral sides of the circumferential portion 11a in a manner similar to that of the embodiment of FIGS. 1–4. Suitable ground supported balancing castor means 24a are interconnected in a similar manner.

In the alternative embodiment of FIG. 5, a hydraulic motor 70 interconnected through hydraulic fluid lines 71 and 72 to a hydraulic pump (not shown) is interconnected to the engine. The hydraulic fluid under pressure provides the desired motivating power for the hydraulic motor in the wheel hub 74. Thus, by proper manipulation of hydraulic valve controls (not shown), independent or selective conjoint rotation of the wheels 20a and 21a is accomplishable to obtain the desired movement of the prime mover. The prime mover of FIG. 5 does not have a bull gear of the type shown in FIGS. 1 and 2, however, a similar drawbar mechanism without a spur gear is mounted on the ring. With this type of ring other types of connecting devices may be used through which motivating power may be focused to the load being worked.

Figure 7:
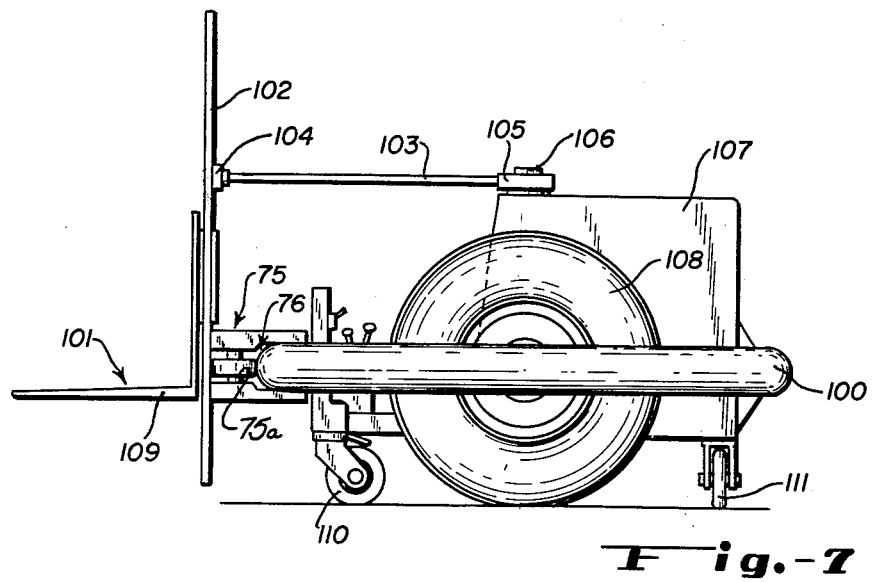
FIG. 7 is a side elevation of an alternative arrangement of a prime mover according to our invention.

FIG. 7 shows one of the alternative arrangements wherein a bifurcated yoke 75 having an enlarged portion 76 partially encompasses the circumferential member. This yoke may be driven by a small motor in driving engagement with rollers such as 35 in FIGS. 1 and 2, or with wheel 75a of FIG. 7, that selectively, frictionally engage the inner or outer surface of the circumferential member, etc.

The prime mover of FIG. 6 is still another alternative arrangement in which the driving wheels 20b and 21b are arranged for selective independent and conjoint rotation by electric motor 80 integrally mounted in each of the hubs, such as hub 81 of the wheel 21b. The engine housing 15b in this case contains a motor-generator assembly which would furnish electric power through connections (not shown) in the axle 82 to the motor 80. The motor includes a rotatable armature 83 interconnected with a commutator 84 which is in operative relation with the carbon brushes 85 and 86. The field winds of the motor are bolted to the inside of a stationary hub 81 across the plates 96 and 97. The armature 87 drives the wheel 21b through the power take-off shaft 95 interconnected with a planetary set 98.

Suitable bearing sets are, of course, necessary for rotation. The construction of the electric drive wheels are well known and available in small to very large sizes. By way of example, a motor of a suitable type may be found in the October 1959 issue of "Power Transmission Design" magazine, pages 60 and 61.

The prime mover of FIG. 6 has a suitable connecting device or drawbar (not shown in FIG. 6) which could be, for example, either of the types discussed above. The selection of the connecting device to be used is controlled by certain criteria. These criteria are dictated by the selective positioning of the connecting device in relation to the ring 11b to thereby focus motivating force from the prime mover to a load being worked.

Although suitable brake systems are necessary with the prime mover of FIGS. 1–4, they need not be included with the electric or hydraulic drive means since as is well known by suitable reverse power application braking or stopping is accomplishable.

FIG. 7 illustrates still another embodiment of a prime mover within our inventive concepts, which combines the pushing and pulling of loads for horizontal positioning, with the actions of lifting and positioning at elevated places. For instance, the ring 100 through its connecting device or drawbar 75 is capable of positioning an associated platform means 101 at any position relative to a vertical axis through the prime mover providing free movability in three dimensions. Spaced above the connecting device 75, and integrally attached to the upright supporting surface 102, is the connecting bar 103. The outer end of the connecting bar 103 is attached to the upright support 102 of the lift and is rotatably mounted by ring 105 and is internally geared. This portion 105 suitably encompasses and may be drivably connected with suitable gearing of a driven vertical shaft at 106. This may, also, be a hydraulic driven ring gear which may be driven by the engine in casing 107. The engine drives a pair of driving wheels, such as wheel 108, for the selective independent and conjoint rotation as described above. Mounted on the forward surface of the support 102 and interconnected therewith for selective vertical positioning is a platform 109. The interconnection between the platform 109 and the support 102 is similar to that of the well known lift truck arrangement. The lift platform is rotatable around the shaft 106 and the ring 100. Suitably ground supported balance means 110 and 111 are associated with the foregoing structure in a manner similar to that described with reference to the embodiment of FIGS. 1 and 2.

It is, of course, to be understood that in the embodiment of FIG. 7 there is a pair of driving wheels positioned on an axle which is substantially coincident with a major chord of the circumferential member so that free movement of the prime mover is obtained.

It should be obvious that an almost infinite number of complicated maneuvers can be accomplished by our novel prime mover. For instance, either of the wheels may be rotated in opposite or similar directions with intermittent locking and unlocking of the connecting device or drawbar, to produce small or large increments of movement in the load being worked. Thus the prime mover is valuable for such jobs as an aircraft tug for hangars and the like, a tug for warehouses, etc.

Although we have shown an annular circumferential member, it is anticipated that other arrangements may be used, such as a circular planar engine support surface. The criteria for other arrangements is a circumferential perimeter (such as the outside peripheral surface of the embodiments shown in the drawings) which may be moved to any angular position in a given horizontal plane, and on which the drawbar may be positioned throughout 360 degrees. This provides a universal movement through which the motivating force may be focused at any angle to loads being worked.

Also, because of the novel arrangement of elements which is within our inventive concepts, it is possible to obtain a very low silhouette. With such a low silhouette a short drawbar or connecting device may be used, giving positive control. One example is the use of our device as an aircraft tug or prime mover wherein it is desirable to have the prime mover sufficiently close to the ground, i.e. low silhouette, so that they may be driven or maneuvered under the aircraft fuselage or wing and interconnected with the aircraft landing gear.

Another environment wherein the electric or hydraulic embodiments are particularly useful is in such places as a storage area for aircraft where maneuvering room is extremely limited. The electric motor arrangement provides an even more attractive function since the operation of the prime mover can be remotely controlled as by lead wires and a small control box, with the operator not riding the prime mover.

It is also anticipated that the circumferential member or ring could be of a split ring configuration wherein one-half of the ring would rotate with respect to the other to thereby meet the criteria of multi-angular positionment of one portion relative to a connecting device through which motivating force is directed. Also, although it is not shown in the drawings, particularly with the electric powered embodiment, it is possible to have the axle extend entirely across the circumferential member and be connected to the internal peripheral surface thereof for greater strength, etc.

Having thus described our invention, it is readily apparent that many alternative arrangements of parts can be assembled to produce prime movers embodying our inventive concepts. Thus, we do not wish to be limited to our specific arrangements but rather by the spirit and scope of our invention as set forth in the following claims.

We claim:

1. In a self-propelled prime mover, a frame inclusive of a horizontally disposed circumferential portion, a pair of driving wheels mounted on said frame inwardly of said circumferential portion on an axle substantially coincident with a chord of said circumferential portion, drive means for each said wheel arranged for independent selective forward and reverse rotation of said wheels, ground supported balancing means within the circumferential portion spaced from said wheels and arranged to maintain said circumferential portion in substantially a horizontal attitude in any position, and means supported on and freely movable around the circumferential portion for focusing motivating power to a load to be worked upon.

2. In a self-propelled prime mover, a frame inclusive of a horizontally disposed circumferential portion, a pair of driving wheels mounted on said frame inwardly of said circumferential portion on an axle substantially coincident with a chord of said circumferential portion, drive means for each said wheel arranged for independent selective forward and reverse rotation of said wheels, ground supported balancing means within the circumferential portion spaced from said wheels and arranged to maintain said circumferential portion in substantially a horizontal attitude in any position, and power driven means supported on and freely movable around the circumferential portion for focusing motivating power to a load to be worked upon.

3. In a self-propelled prime mover, a frame inclusive of a horizontally disposed circumferential portion, a pair of driving wheels mounted on said frame inwardly of said circumferential portion on an axle substantially coincident with a chord of said circumferential portion, drive means for each said wheel arranged for independent selective forward and reverse rotation of said wheels, ground supported balancing means within the circumferential portion spaced from said wheels and arranged to maintain said circumferential portion in substantially a horizontal attitude in any position, and connecting means mounted and arranged on said circumferential portion adapted to be selectively moved therearound and releasably locked in predetermined engagement therewith.

4. A load-moving vehicle comprising a frame, inclusive of a circumferential enclosure portion, a prime mover, inclusive of an axle, disposed within the circumferential enclosure and joining surfaces of the frame for supporting it in a substantially horizontal position, a drawbar supported outwardly from the circumferential enclosure for holding a load to be moved, a pair of drive wheels mounted on the axle of the prime mover within the enclosure and arranged for selective independent forward and reverse rotation, means within the enclosure and distant from said axle for supporting the prime mover against tilting during operation of said drive wheels, means for disengaging adjoining surfaces of the frame and load holding means whereby the prime mover may move angularly with the enclosure through a 360° range while the load remains stationary, and means associated with the prime mover for controlling operative movement of said drive wheels when said adjoining surfaces are in engaged or disengaged relation whereby the prime mover may direct pushing or pulling forces to or from the load throughout a 360° angular range.

5. A load-moving vehicle comprising a frame, inclusive of a circumferential enclosure portion, a prime mover, inclusive of an axle, disposed within the circumferential enclosure and joining surfaces of the frame for supporting it in a substantially horizontal position, a pivoted drawbar supported outwardly from the circumferential enclosure for holding a load to be moved, a pair of drive wheels mounted on the axle of the prime mover within the enclosure and arranged for selective independent forward and reverse rotation, means within the enclosure and distant from said axle for supporting the prime mover against tilting during operation of said drive wheels, means for disengaging adjoining surfaces of the frame and load holding means whereby the prime mover may move angularly with the enclosure through a 360° range while the load remains stationary, and means associated with the prime mover for controlling operative movement of said drive wheels when said adjoining surfaces are in engaged or disengaged relation whereby the prime mover may direct pushing or pulling forces to or from the load throughout a 360° angular range.

6. A load-moving vehicle comprising a frame, inclusive of a circumferential enclosure portion, a prime mover, inclusive of an axle, disposed within the circumferential enclosure and joining surfaces of the frame for supporting it in an substantially horizontal position, means supported outwardly from the circumferential enclosure for holding a load to be moved, a pair of drive wheels mounted on the axle of the prime mover within the enclosure and arranged for selective independent forward and reverse rotation, caster-type wheels for supporting opposite ends of the prime mover against tilting during operation of said drive wheels, means for disengaging adjoining surfaces of the frame and load holding means whereby the prime mover may move angularly with the enclosure through a 360° range while the load remains stationary, and means associated with the prime mover for controlling operative movement of said drive wheels when said adjoining surfaces are in engaged or disengaged relation whereby the prime mover may direct pushing or pulling forces to or from the load throughout a 360° angular range.

7. A load-moving vehicle comprising an annular frame, a prime mover, inclusive of an axle, disposed interiorly of the frame and fixedly joined thereto for its support in a substantially horizontal position, a pair of drive wheels mounted on said axle interiorly of the frame and arranged for selective independent forward and reverse rotation, means interiorly of the frame and distant from said axle for supporting the prime mover against tilting during operation of said drive wheels, a drawbar assembly supported outwardly from the frame for holding a load, coacting gears on the frame and drawbar assembly, means for disengaging said gears whereby the prime mover may move angularly relative to the drawbar through a 360° range while the load remains stationary, and means associated with the prime mover for controlling operative movement of said drive wheels when said gears are in engaged or disengaged relation whereby the prime mover may direct pushing or pulling forces to or from the load throughout a 360° angular range.

8. A load-moving vehicle comprising an annular frame, a prime mover, inclusive of an axle, disposed interiorly of the frame and fixedly joined thereto for its support in a substantially horizontal position, a pair of drive wheels mounted on said axle interiorly of the frame and arranged for selective independent forward and reverse rotation, means interiorly of the frame and distant from said axle for supporting the prime mover against tilting during operation of said drive wheels, a drawbar assembly supported outwardly from the frame for holding a load, a bull gear secured on the exterior surface of the annular frame for conjoint movement therewith, a movably-supported gear in the drawbar assembly normally meshing with the bull gear, means for disengaging said movably-supported gear whereby the prime mover may move angularly relative to the drawbar through a 360° range while the load remains stationary, and means associated with the prime mover for controlling operative movement of said drive wheels when said gears are in engaged or disengaged relation whereby the prime mover may direct pushing or pulling forces to or from the load throughout a 360° angular range.

References Cited in the file of this patent

UNITED STATES PATENTS

| | | |
|---|---|---|
| 832,518 | Wolcott | Oct. 2, 1906 |
| 1,038,114 | Getz et al. | Sept. 10, 1912 |
| 1,106,217 | Hoag | Aug. 4, 1914 |
| 1,307,944 | Watson | June 24, 1919 |
| 2,224,411 | Smith | Dec. 10, 1940 |
| 2,732,022 | Lapsley et al. | Jan. 24, 1956 |
| 2,925,134 | Cunningham | Feb. 16, 1960 |

FOREIGN PATENTS

| | | |
|---|---|---|
| 108,534 | Australia | Sept. 12, 1939 |